(12) United States Patent
Shrivastava et al.

(10) Patent No.: US 11,876,743 B2
(45) Date of Patent: Jan. 16, 2024

(54) METHOD AND SYSTEM FOR PROVISIONING RADIO RESOURCES FOR IDLE OR INACTIVE MODE USER EQUIPMENT IN WIRELESS NETWORK

(71) Applicant: SAMSUNG ELECTRONICS CO., LTD., Suwon-si (KR)

(72) Inventors: Vinay Kumar Shrivastava, Bangalore (IN); Avijit Manna, Bangalore (IN); Atul Kumar Tomar, Bangalore (IN); Ankit Dhabriya, Bangalore (IN); Madhavan Vedasoundararajulu, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 17/396,600

(22) Filed: Aug. 6, 2021

(65) Prior Publication Data
US 2022/0052808 A1 Feb. 17, 2022

(30) Foreign Application Priority Data

Aug. 7, 2020 (IN) .............................. 202041033862
Aug. 5, 2021 (IN) .............................. 202041033862

(51) Int. Cl.
*H04L 5/00* (2006.01)
*H04W 76/27* (2018.01)
*H04W 72/23* (2023.01)

(52) U.S. Cl.
CPC ........... *H04L 5/0048* (2013.01); *H04W 72/23* (2023.01); *H04W 76/27* (2018.02)

(58) Field of Classification Search
CPC ...... H04L 5/0048; H04W 76/27; H04W 72/23
See application file for complete search history.

(56) References Cited

U.S. PATENT DOCUMENTS

2021/0360611 A1* 11/2021 Manolakos ........... H04L 5/0053
2023/0108137 A1* 4/2023 Tie .................... H04W 52/0216

OTHER PUBLICATIONS

RP-193239 New WID: UE Power Saving Enhancements.
(Continued)

*Primary Examiner* — Ronald B Abelson
(74) *Attorney, Agent, or Firm* — F. CHAU & ASSOCIATES, LLC

(57) ABSTRACT

A method for provisioning radio resources for Idle or Inactive mode user equipment in wireless network includes configuring by a network node for Idle or Inactive mode of a UE, a plurality of reference signals comprising of reuse of at least one of Connected mode reference signal including at least one of Non-Zero Power Channel State Indicator Reference Signal (NZP-CSI-RS) resource, Tracking Reference Signal (TRS) resource, Phase Tracking Reference Signal (PTRS) resource. A new reference signal including at least one of NZP-CSI-RS resource, TRS resource, PTRS resource and new Demodulation Reference Signal (DMRS) or DMRS like signal is configured. The UE is enabled based on at least one of the reference signals from the configured plurality of reference signals for performing one or more of at least one of gain, time, phase and frequency synchronization, Radio Resource Management (RRM) measurements, and Quasi-Co-Location (QCL) assumption for Paging PDCCH decoding.

18 Claims, 9 Drawing Sheets

(56) References Cited

OTHER PUBLICATIONS

TS 38.304 User Equipment (UE) procedures in idle mode and in RRC Inactive state.
TS 38.331 NR RRC Specification.
TS 38.211 PHY Specification; NR Physical channels and modulation.

* cited by examiner

METHOD AND SYSTEM FOR PROVISIONING RADIO RESOURCES FOR IDLE OR INACTIVE MODE USER EQUIPMENT IN WIRELESS NETWORK

CROSS-REFERENCE TO RELATED APPLICATION

The present application claims priority under 35 U.S.C. § 119 to Provisional Indian Patent Application No. 202041033862, filed on Aug. 7, 2020 and Indian Patent Application No. 202041033862 filed on Aug. 5, 2021, the entire contents of which are herein incorporated by reference.

FIELD OF THE INVENTION

The present invention generally relates to wireless communication and more particularly relates to a method and system for provisioning radio resources for Idle or Inactive mode user equipment in wireless network

DISCUSSION OF THE RELATED ART

In recent years, significant growth and development have been witnessed in the realm of wireless communication. Wireless communication networks are widely deployed to provide various communication services such as audio, video, packet data transmission, messaging, broadcasting, etc. FIG. 1 illustrates a state-of-the-art implementation of 5G system for paging reception in Idle or Inactive mode. The 5G system may include a number of base stations (BS) or eNodeB or gNodeB; each simultaneously communicates with multiple wireless transmission/reception unit (WTRU) or User Equipment (UE). With the rapid use of the UE in 5G technology a reduced consumption of power in UEs is always preferred. For example, there is an excessive power consumption during Idle/Inactive mode for Automatic Gain Control (AGC), Symbol Time Recovery (STR), Automatic Frequency Control (AFC), and Radio Resource Management (RRM) measurements when utilizing legacy Synchronization Block (SSB) which consists of secondary synchronization signal (SSS) or Physical Broadcast Channel Demodulation Reference signal (PBCH DMRS) for the afore-mentioned purposes. The one possible reason of excessive power consumptions may be a periodic occurrence of the SSB which is usually having a periodicity of 20 ms. Due to the periodic occurrence of the cell-specific SSB and UE-specific/Paging-group-specific paging occasions, the SSB may not align with the paging occasions where UE awakes and monitors for paging messages. Consequently, the UE needs to awake for longer duration to receive the SSB reference signals and perform measurements to tune the AGC, AFC and STR or perform RRM measurements and then perform paging receptions at paging occasions.

In order to address the aforementioned problem, there is a need to define a new reference signal for the Idle/Inactive mode UEs which is better aligned/positioned with respect to the paging occasion considering objectives like reduced power consumption for the Idle/Inactive modes in the UEs.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

In an implementation, the present invention relates to a method for provisioning radio resources for Idle or Inactive mode user equipment in wireless network. The method includes configuring by a network node for Idle or Inactive mode of a UE, a plurality of reference signals comprising of reuse of at least one of Connected mode reference signal including at least one of Non-Zero Power Channel State Indicator Reference Signal (NZP CSI-RS) resource, Tracking Reference Signal (TRS) resource, Phase Tracking Reference Signal (PTRS) resource. The method includes configuring by a network node a new reference signal including at least one of NZP CSI-RS resource, TRS resource, FIRS resource and new Demodulation Reference Signal (DMRS) or DMRS like signal. The method includes enabling the UE based on at least one of the reference signals from the configured plurality of reference signals for performing one or more of at least one of gain, time, phase and frequency synchronization, Radio Resource Management (RRM) measurements, and Quasi-Co-Location (QCL) assumption for Paging PDCCH decoding.

In another embodiment of the present disclosure, a UE for provisioning radio resources for Idle or Inactive mode in a wireless network, the UE comprising a processor and a transceiver configured for receiving from a network node during Idle or Inactive mode a plurality of reference signals comprising of at least one of reuse of Connected mode reference signals including at least one of Non-Zero Power Channel State Indicator Reference Signal (NZP CSI-RS) resource, Tracking Reference Signal (TRS) resource, Phase Tracking Reference Signal (PTRS) resource and a new reference signal including at least one of NZP CSI-RS resource, TRS resource, PTRS resource, new Demodulation Reference Signal (DMRS) or DMRS like signal. The processor maybe configured to perform based on said at least one of the reference signals from the configured plurality of reference signals at least one of gain, time, phase and frequency synchronization, Radio Resource Management (RRM) measurements and Quasi-Co-Location (QCL) assumption for Paging PDCCH decoding.

In another embodiment, a method of beam sweeping for paging is disclosed. The method includes, beamforming, by the network node, the reference signal resources by enabling at least one reference signal resource per beam based on transmission of reference signal resources across all the beams. The method includes providing, by the network entity, reference signal resources beamforming related configurations to UE using at least one of: broadcast signaling (e.g. a system information broadcast, SIB) message and RRC signaling message. The method includes selecting by UE the beam(s) for the reception of the paging message by selecting beam(s) based on at least one of: SSB and reference signal resources. The method includes using by the UE the reference signal for at least one of time, frequency, phase correction and gain control before the paging occasion (PO).

To further clarify the advantages and features of the present invention, a more particular description of the invention will be rendered by reference to specific embodiments thereof, which is illustrated in the appended drawing, it is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE DRAWINGS

Figure 1:
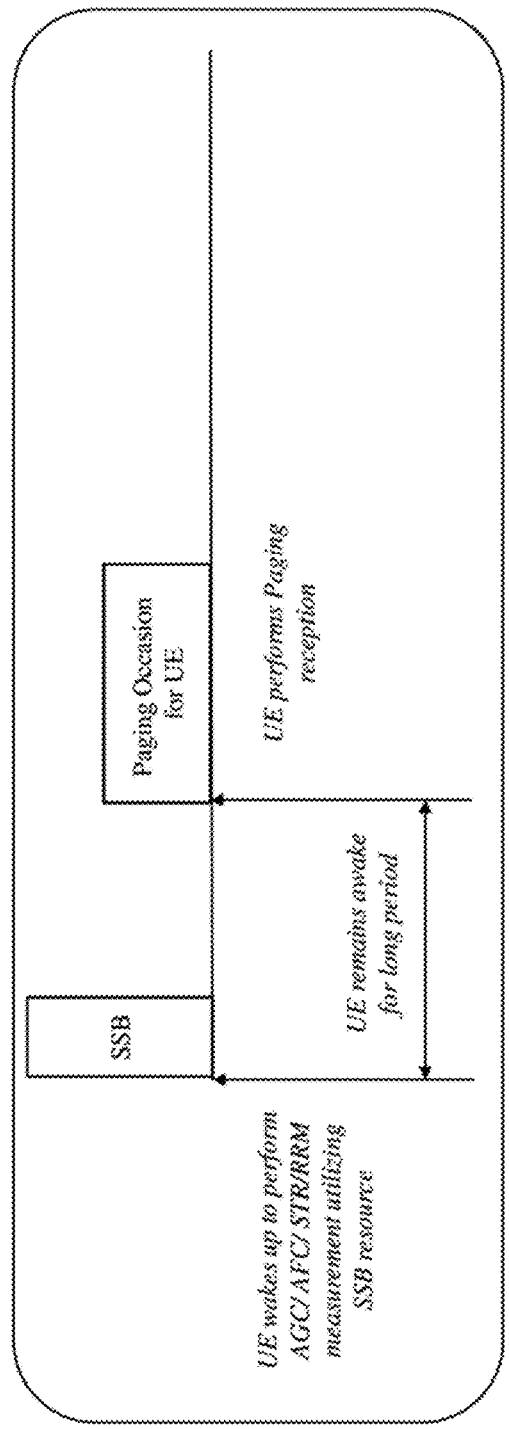
FIG. 1 illustrates a state-of-the-art implementation of 5G system for paging reception in Idle or Inactive mode.

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element" Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Embodiments of the present invention will be described below in detail with reference to the accompanying drawings.

A method and system to reduce power consumption for Idle/Inactive mode UEs with provisioning a plurality of reference signal resources is disclosed. The reference signal resource configuration (this may include one or more of parameters for periodicity, offset, descrambling identity, beamforming, position and so on) is configured by the network node to efficiently support Idle/Inactive mode UEs in conjunction with paging reception operations. In an embodiment of the present subject matter, the network node may be a base station such as gNB, eNB, WIFI Access Point or a core network entity such as AMF, UPF or a combination thereof. The user equipment may be a mobile device, computer, laptop, personal digital assistance (PDA), a vehicle with communication facility or any similar device capable of communicating using wireless communication.

As an exemplary scenario, in Idle/Inactive mode of a UE, New Radio (NR) UE wakes up at pre-defined intervals to perform paging procedure. An NR call transmits paging information periodically at paging occasion (PO) in paging frame (PF) and the UE should be capable to decode paging information to know if UE is being paged. To reduce the power consumption, a UE in Idle/Inactive mode power down its RF and other related HWs and move to sleep mode. UE wakes up periodically at the PO in a PF to receive the paging message from the network node. However, in order to improve receiver performance, the UE must perform at least one of timing, frequency, phase and gain acquisition before PF or PO.

Further, in legacy NR, the only reference signal that can be used by Idle/Inactive mode of UE for performing timing, frequency, phase and gain synchronization operation is secondary synchronization signal (SSS) or Physical Broadcast Channel Demodulation Reference signal (PBCH DMRS). The SSS or PBCH DMRS signal may be present as part of SSB. By default, the periodicity of SSB is 20 ms, and hence the UE has to compute its wakeup by taking in consideration a position of both Synchronization Block (SSB) and PO in Idle/Inactive mode Discontinuous Reception (DRX) or paging cycle (e.g. In Idle/Inactive mode, Core Network (CN) paging is received at CN paging cycle and in Inactive mode, RAN paging is received at RAN paging cycle). Moreover, the SSB periodicity is a configurable parameter from the network node and it can take values as high as few hundreds of milli-seconds. In case, when PO and SSBs are not aligned, the UE may have to wakeup much ahead of PO for performing SSB based timing, frequency, phase and gain synchronization mechanism. However, this would not be an optimum solution as it may result in high power consumption in Idle/Inactive mode because the UE has to remain awake for longer duration of time. Further, a timing, frequency, phase and gain compensation based on SSB would be outdated with respect to channel conditions of PO. This may require the UE to unnecessarily wake up before in many slots, in order to decode the SSB signal. Additionally, as the SSB occasions could be fir apart to PO therefore this approach, may not be power efficient in all cases and may not give optimal time, frequency, phase and gain adjustment needed just before PO.

Therefore, in order to overcome the above-mentioned issues, the present disclosure proposes a mechanism to utilize reference signal resources in Idle or Inactive mode in accordance with Paging Occasion (PO) or Paging Frame (PF) for at least one of a time, frequency, phase and gain acquisition, Quasi-Co-Location characteristics of Paging PDCCH and/or Paging PDSCH and RRM measurements in Idle or Inactive mode instead of waking up early and using SSB signal, according to an embodiment of the present subject matter.

Figure 2:
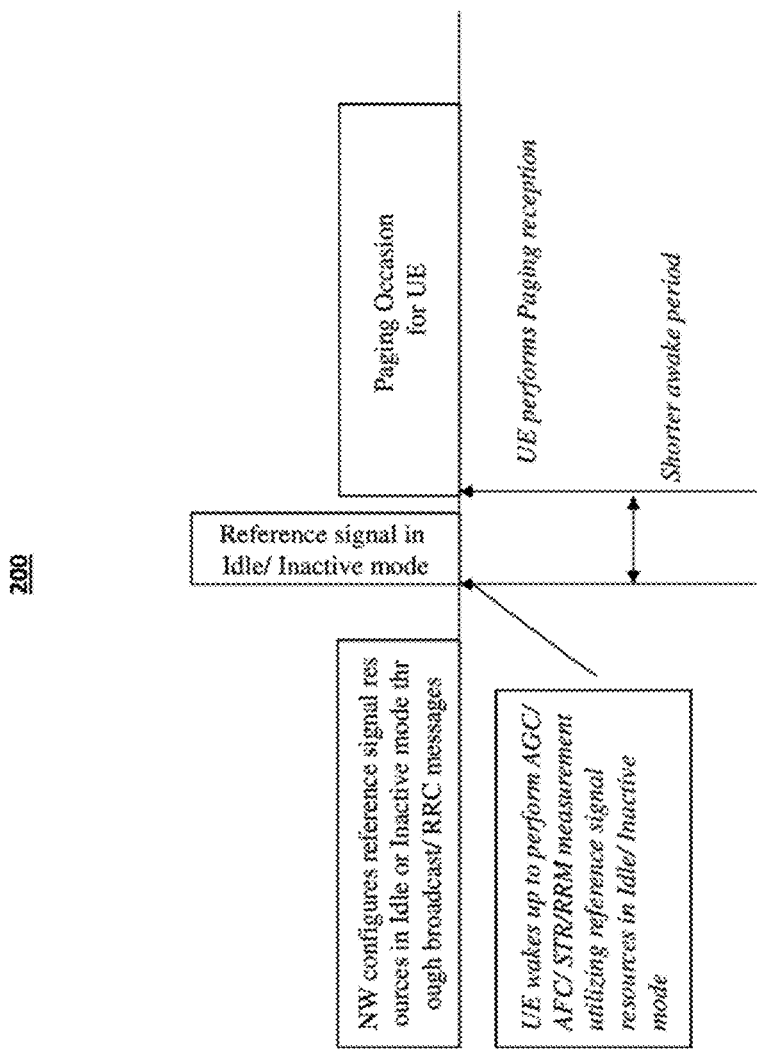
FIG. 2 illustrates a flow diagram depicting another exemplary embodiment of a method of reference signal resource configuration for Idle/Inactive mode UE, according to an embodiment of the present subject matter.

FIG. 2 illustrates a flow diagram 200 depicting another exemplary embodiment of a method of reference signal configuration for Idle or Inactive mode, according to an embodiment of the present subject matter. In an embodiment, a plurality of single port NZP CSI-RS may be configured with density 1 or 3 in Idle or Inactive mode. In another embodiment. Connected mode NR NZP CSI-RS and/or NR Tracking Reference Signal (TRS) resources can be configured by the network node to be reused in Idle/Inactive mode UE. The Network node may configure the reference signal resources for a group of UEs or a paging-group of UEs or in cell specific manner. Network node Multiple reference signal resources may be configured by the network. The UE selects a subset of configured reference signal based on at least one of its PO, position of reference signal in time domain, scrambling ID, channel conditions, support of specific 3GPP release and UE capability. In one embodiment, the network node can reuse at least one of Connected mode reference signal including at least one of Non-Zero Power Channel State Indicator Reference Signal (NZP CSI-RS) resource, Tracking Reference Signal (TRS) resource and Phase Tracking Reference Signal (PTRS) resource to configure a plurality of reference signal resource in Idle or Inactive mode. In another embodiment, a new reference signal including at least one of TRS (Tracking Reference Signal), PTRS (Phase Tracking Reference Signal), a newly introduced DMRS (Demodulation Reference Signal) or DMRS like signal can be configured as reference signal resource by the network node in Idle or Inactive mode. Legacy DMRS signal associated with paging PDCCH (PDCCH DMRS) can also be enhanced to configure before PO for tracking/sync purpose. In Idle or Inactive mode, the Network node may configure the reference signal through a broadcast message. As an example, Network node may use existing SIB message such as DownlinkConfigCommonSIB in SIB1 wherein pcch-Config is provided or it may use a newly introduced SIB message for this purpose.

As an example, the Connected mode Tracking, Reference Signal (TRS) and/or the Channel State Indicator Reference Signal (CSI-RS) may be considered suitable as reference signal resource in Idleldle or Inactive mode based on following points:

The IRS or CSI-RS may be mapped in limited time and frequency within a slot therefore the power consumption will be lower;

The TRS CSI-RS signal generation may be made group-common to be known to larger set of UEs;

The TRS or CSI-RS offers additional benefits for performing radio resource management (RRM) measurements, besides time, frequency, phase and gain acquisition;

The reuse of Connected mode TRS or CSI-RS ensures no new bandwidth allocation from the network side;

There is no or minimal impact on legacy UEs of introducing CSI-RS in Idle/Inactive mode.

Figure 3:
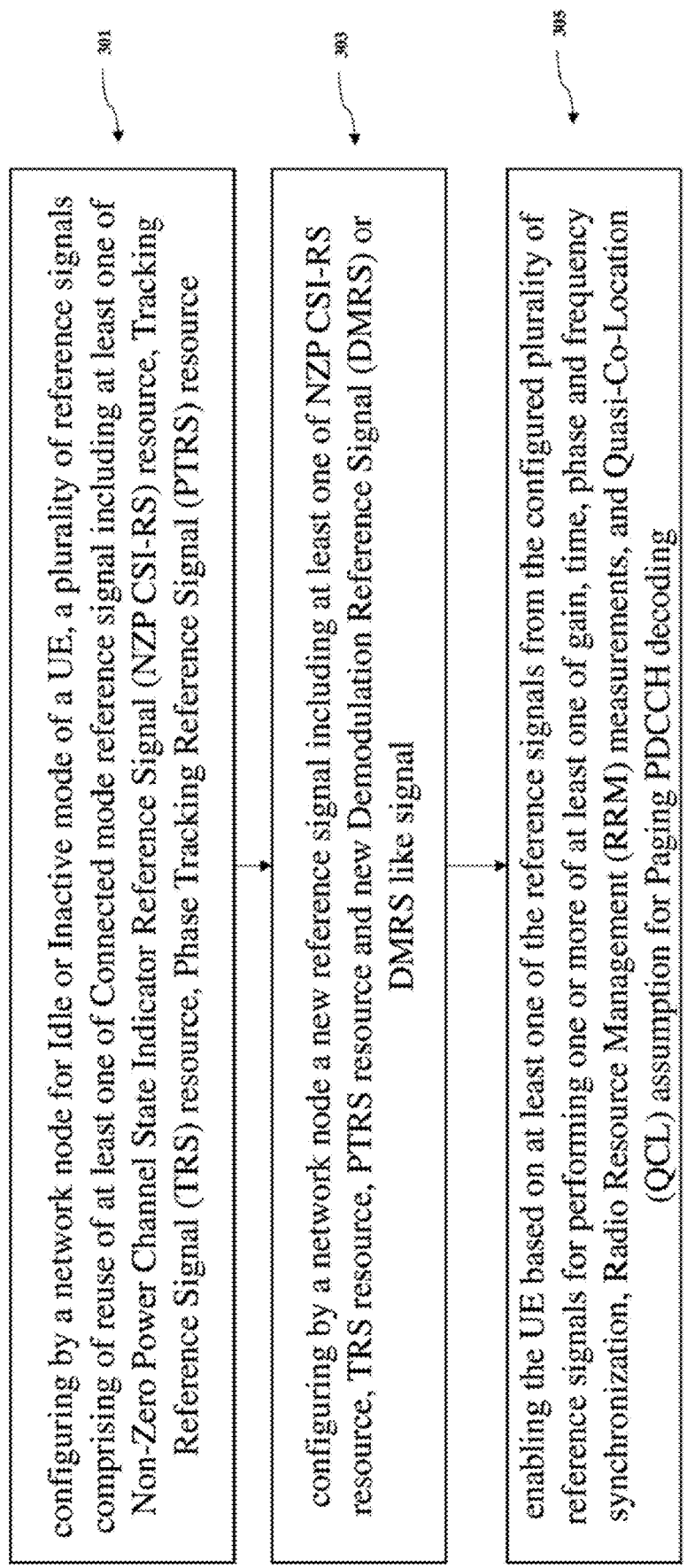
FIG. 3 illustrates a flow diagram depicting an exemplary embodiment of a method for provisioning radio resources for Idle or Inactive mode UEs in wireless network, according to an embodiment of the present subject matter.

FIG. 3 illustrates a flow diagram depicting an exemplary embodiment of a method for provisioning radio resources for Idle or Inactive mode UEs in wireless network, according to an embodiment of the present subject matter. The method 300 may include configuring at a step 301, by a network node for Idle or Inactive mode of a UE, a plurality of reference signals comprising of reuse of at least one of Connected mode reference signal it at least one of Non-Zero Power Channel State Indicator Reference Signal (NZP CSI-RS) resource, Tracking Reference Signal (TRS) resource and Phase Tracking Reference Signal (PTRS) resource.

The method 300 may include configuring at a step 303, by a network node a new reference signal including at least one of NZP CSI-RS resource TRS resource, PTRS resource and new Demodulation Reference Signal (DMRS) or DMRS like signal as reference signal resource for Idle or Inactive mode UE. The network node may be configured to use at least one of the step 301 or step 303.

In an embodiment, the configuration of reference signal resource is performed as at least one of placing new configuration within existing broadcast message such as SIB1 or other SIB or newly introduced broadcast message such a new SIB in the Idle or Inactive mode. The UEs may be configured by RRC signaling such as an RRC reconfiguration message based on configuration changes pertinent to common reference signal resources in the Connected mode. The UEs may be configured by at least one of RRC Release, RRC Release with Suspend Config and RRC Release with Redirection message when moving UE to Idle or Inactive mode from Connected mode.

In an embodiment, the network node may be configured to perform at least one of reusing the Connected Mode scrambling ID and configuring a common scrambling ID for the reference signal reception for Idle/Inactive UEs and descrambling at the UEs the reference signal resources based on the configured scrambling ID in Idle or Inactive mode. The common scrambling ID is determined based on Paging Occasion (PO) and at least one of a Cell specific identifier configured by Network node and a Physical Cell identifier for determining the Scrambling ID.

In an embodiment, the configuration of reference signal resource may be performed in Idle or Inactive mode as at least one of a first type of mapping defined by configuring by the Network node as a plurality of slot and symbol offset before paging occasion (PO) and a second type of mapping defined by configuring by the Network node, a at least one symbol from a plurality of symbols of paging slot for reference signal resources transmission for each beam.

In an embodiment, the UE may be configured to indicate information pertaining to preference, capability, assistance to support the reference signal resources in Idle or Inactive mode to the network by communicating through at least one of capability information message and UE assistance information message. Further, the capability information message or UE assistance information message is based on at least one of Misalignment of SSB resources position or occurrence with respect to the paging occasion (PO), change of cell or serving gNB or handover or UE identity change and requirement for power saving.

In an embodiment, the reference signal resources are associated with SSB beams, and the UE may consider a corresponding Synchronization Signal Block (SSB) as the base for quasi-colocation (QCL) and a timing calculation of reference signal in Idle or Inactive mode. The QCL type and association with SSB for the reference signal resource is configured by network node in at least one of a broadcast message and a RRC signaling message. The QCL type of paging PDCCH and/or Paging PDSCH and association with SSB and/or reference signal resource in Idle or Inactive mode is configured by network node in at least one of a broadcast messages and a RRC signaling message.

In an embodiment, the UE may be configured to selects the reference signal resource from the configured plurality of the reference signal resources based on at least one or more of its Paging Occasion (PO), scrambling ID channel conditions, support of specific 3GPP release, UE capability, and position of the reference signal in time domain with respect to its PO In an embodiment, a frequency for reference signal resource used for Idle or Inactive mode is same frequency, band, band-width part (BWP), sub-carrier spacing, power allocation than that is used for at least one of initial BWP, paging PDCH and paging PDSCH. In another embodiment the frequency of the reference signal used for Idle/Inactive mode can be different frequency, band, band-width part (BWP), sub-carrier spacing, power allocation than that is used for at least one of initial BWP, paging PDCCH and paging PDSCH. The frequency, band, BWP, sub-carrier spacing and power allocation for the reference signal resource in Idle or Inactive mode is configured by network node in at least one of broadcast message and RRC signaling message. The UE assumes frequency, band, BWP, sub-carrier spacing and power allocation for the reference signal resource in Idle or Inactive mode is same with the at least one of Initial BWP, paging PDCCH and paging PDSCH in absence of configuration from network node in at least one of broadcast message and RRC signaling message.

In an embodiment, the network node configures using at least one of a broadcast message and RRC signal providing at least one of support for reference signal resource in Idle or inactive mode, frequency domain location of the reference signal resource, time domain location of the reference signal resource in terms of slot and symbol position, number of resources or repetitions or density of the reference signal in time and frequency domain, QCL information for Paging PDCCH and reference signal resource, QCL information for reference signal resource and SSB blocks, Association or non-association of reference signal resource with SSB blocks, power of et of reference signal resource with reference to SSB blocks, and slot and symbol offset of the reference signal resource from the Paging Occasion (PO).

Subsequently, the method 300 includes enabling at a step 305, the UE based on at least one of the reference signal from the configured plurality of reference signals for performing one or more of at least one of gain, time, phase and frequency synchronization, Radio Resource Management (RRM) measurements, and Quasi-Co-Location (QCL) assumption for Paging PDCCH decoding.

Figure 4:
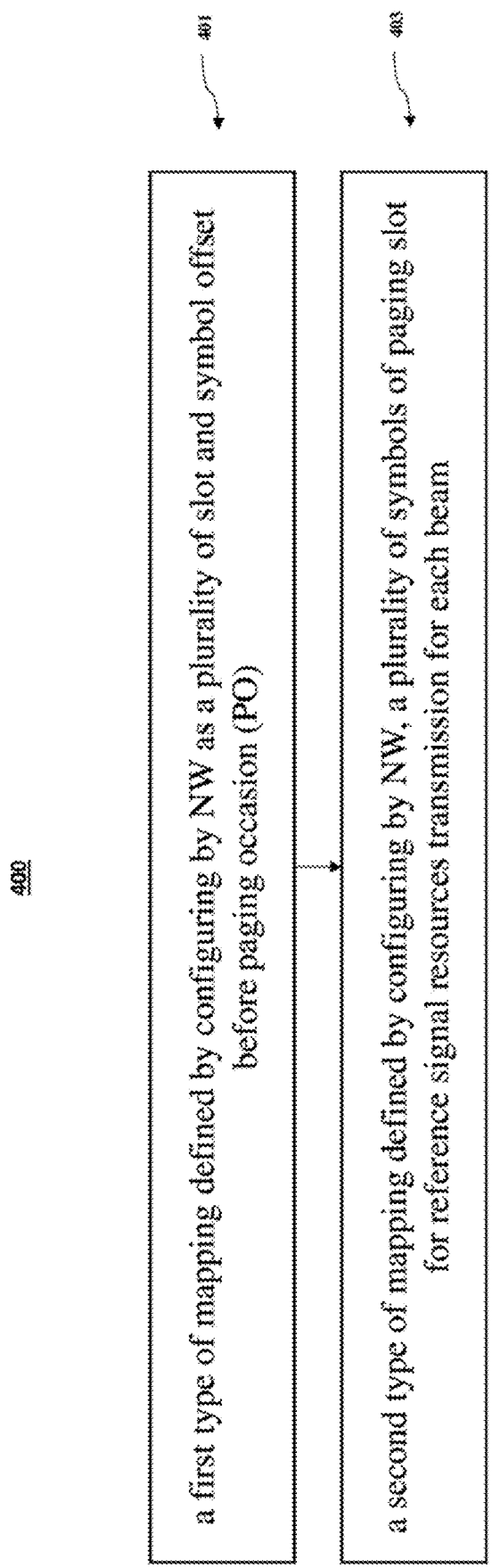
FIG. 4 illustrates a flow diagram depicting a method for reference signal (e.g. CSI-RS) Mapping first type and second type in Idle/Inactive mode, according to an embodiment of the present subject matter.

FIG. 4 illustrates a flow diagram 400 depicting a method for reference signal (e.g. CSI-RS, TRS) Mapping first type and second type in Idle/Inactive mode, according to an embodiment of the present subject matter. The method 400 may include configuring at a step 401, by Network node as a plurality of slot and symbol offset before paging occasion (PO). This may be referred as a reference signal resource Mapping first type. The method 400 may include configuring at a step 403, by Network node, a plurality of symbols of paging slot for reference signal resources transmission for each beam. This may be referred as a reference signal resource Mapping second type. The reference signal resources are provided for Idle/Inactive mode RRM measurement as well as time, frequency, phase and gain acquisition purpose. The reference signal resource Mapping second type is more suitable in multi-beam scenario. However, both type of configurations can be used as a single or in combination to support the purpose of reference signal resources in Idle or Inactive mode. The reference signal resources configurations may be provided in the SIB message to the UE. In particular, the reference signal resource mapping in Idle/Inactive mode may be categorized based on a mapping configuration. The mapping may be referred as reference signal Mapping first type configuration and reference signal Mapping second type configuration.

Figure 5A:
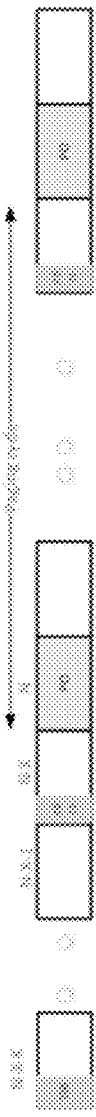
FIG. 5A illustrates an implementation reference signal resource Mapping first Type, according to an embodiment of the present subject matter.

FIG. 5A illustrates an implementation reference signal Mapping first Type, according to an embodiment of the present subject matter. Accordingly, in any network a reference signal. Mapping first type may be configured in a system information block (SIB) message using a combination of slot and symbol offset before the paging occasion. On reception of such configuration a UE supporting reference signal resources in Idle or Inactive mode, may wake up at reference signal resource position as defined by slot and symbol offset before the paging occasion to perform time, frequency, phase and gain acquisitions as well as RRM measurements. FIG. 5(a) shows a high-level view of reference signal resource Mapping First Type transmission before paging occasion.

Figure 5B:
FIG. 5B illustrates an implementation reference signal resource Mapping second type, according to an embodiment of the present subject matter.

FIG. 5B illustrates an implementation reference signal Mapping second type, according to an embodiment of the present subject matter. According to an aspect of the invention, in a multi-beam scenario, same paging message may be repeated in all beams and the UE may be configured to selects the best beam to monitor the associated PO for the paging message. Therefore, in an implementation, the reference signal resources for Idle or Inactive mode may be associated to the beam-PO using reference signal resource Mapping Second Type. Using the reference signal. Mapping second type configuration in SIB message may allow a network to reserve a plurality (for example at least one of one and two) of symbols of paging slot for reference signal resources transmission. This will help the UE to perform time, frequency, phase and gain acquisition and decoding the paging message on a selected beam. FIG. 5B shows high level view of reference signal resource second. Type transmission placed at the paging occasion.

In another embodiment, a UE in Idle or Inactive mode selects a subset of reference signal resources from the plurality of reference signal configured as at least one of Mapping first type and Mapping second type based at least one of on Paging Occasion (PO), time domain position of the reference signal, scrambling ID and current multi-beam environment for paging message.

In another embodiment, a UE in Idle or Inactive mode selects at SSB for at least one of time, frequency, phase, gain compensation, RRM measurement and QCL assumption based on at least one of when the reference signal resource is not configured by the network node in Idle or Inactive mode through at least one of broadcast and RRC signaling message, when the reference signal resource is not available or indicated as not available by the network node through signaling message such as DCI (Downlink Control Information) or broadcast message (e.g. SIB) at certain occasions or time period in Idle or Inactive mode, when the reference signal is not detected at certain occasions or time period due to at least one of multi-SIM operation, RF unavailability and temporary loss of signal coverage, when the reference signal is detected as disabled, when the SSB position in time domain with respect to its paging occasion (PO) is nearby, when misalignment for SSB is not detected at certain occasions or time period before the paging occasion (PO)

Figure 6:
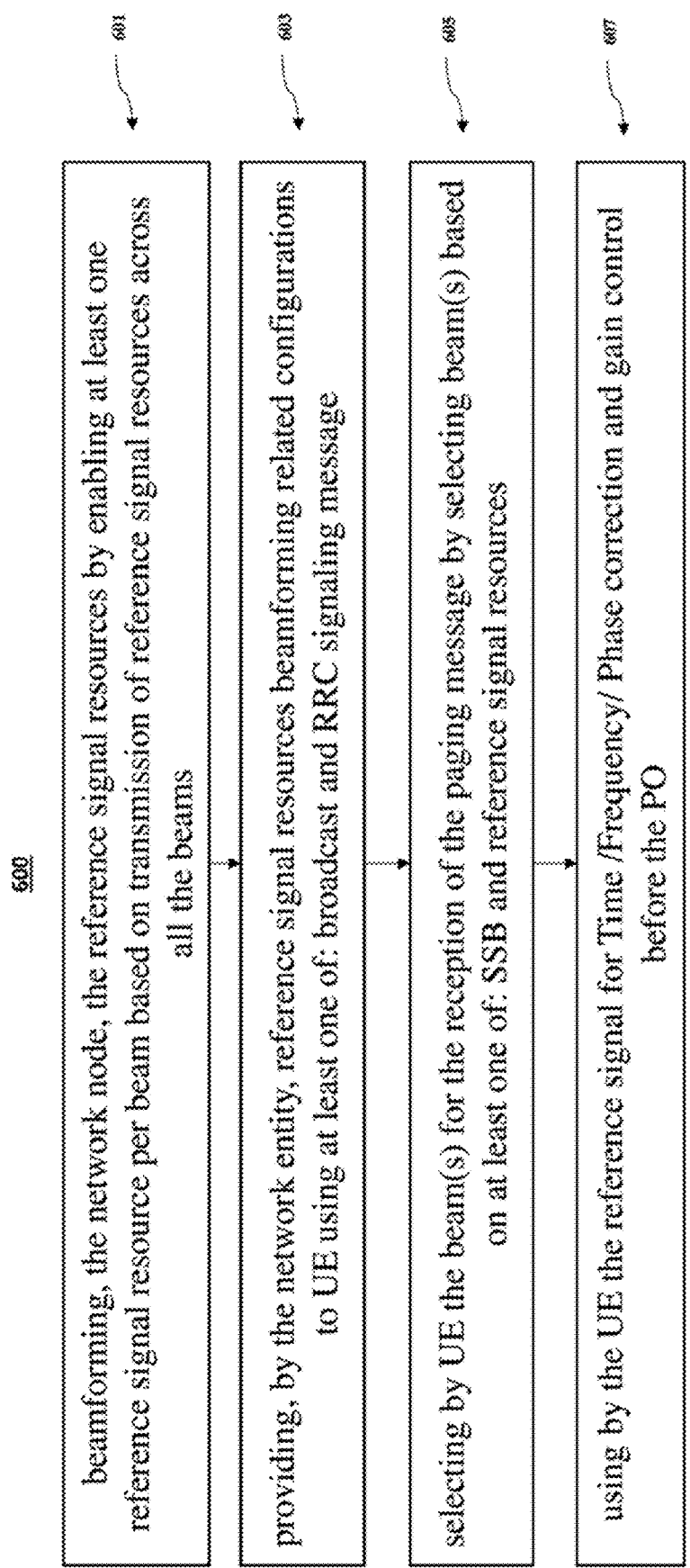
FIG. 6 illustrates a flow diagram depicting an exemplary embodiment of a method of beam sweeping for paging, according to an embodiment of the present subject matter.

FIG. 6 illustrates a flow diagram 600 depicting an exemplary embodiment of a method of beam sweeping for paging, according to an embodiment of the present subject matter. The method 600 may include beamforming at a step 601, the network node, the reference signal resources by enabling at least one reference signal resource per beam based on transmission of reference signal resources across all the beams.

The method 600 may include providing at a step 603, by the network entity, reference signal resources beamforming related configurations to UE using at least one of: broadcast and RRC signaling message.

Consequently, the method 600 may include selecting at a step 605, by UE the beam(s) for the reception of the paging message by selecting beam(s) based on at least one of: SSB and reference signal resources.

Subsequently, the method 600 may include using at a step 607, by the UE the reference signal for Time/Frequency/Phase correction and gain control before the PO.

Figure 7:
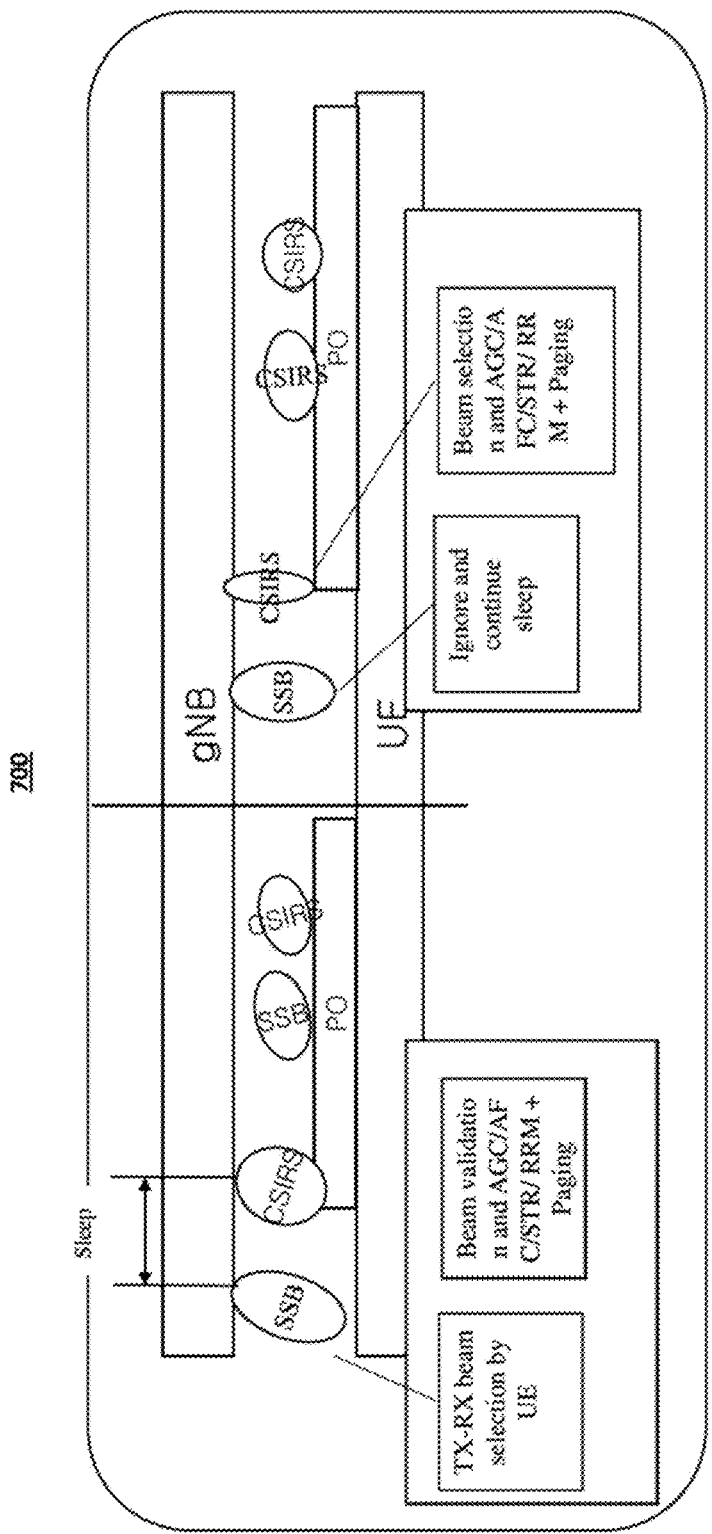
FIG. 7 illustrates a flow diagram depicting an exemplary embodiment of a beam sweeping for paging, according to an embodiment of the present subject matter.

FIG. 7 illustrates a flow diagram depicting an exemplary embodiment of a beam sweeping for paging, according to an embodiment of the present subject matter. In an embodiment, for multi-beam transmission alike to a beam-sweeping of paging, reference signal resources in Idle or Inactive mode may also be beam-firmed and related configurations are provided to UE. For multi-beam operations, same paging message is repeated in all transmitted beams within one PO, and the length of one PO is one period of Beam Sweeping i.e., "S" consecutive PDCCH monitoring occasions. Therefore, UE needs to select the beam(s) for the reception of the paging message. To keep as complexity in the configuration, the reference signal resources in Idle or Inactive mode may also be beam-formed and placed in PO associated slot(s) and related configurations are provided to UE. The UE could select beam(s) for the reception of reference signal resources in Idle or Inactive mode for Time/Frequency correction and gain control before PO. Even though reference signal resources in Idle or Inactive mode resources are transmitted in all the beams, increase in overhead would be minimum i.e., possibly one reference signal resources in Idle or inactive mode resource per beam.

As an example, a Connected mode NR NZP CSI-RS and/or TRS resources may be used for Idle/Inactive mode RRM measurements and gain, time, phase and frequency synchronization. In particular, the legacy NR NZP CSI-RS and/or TRS resources for using commonly by a group of UEs or cell-specific manner, a common scrambling Id is applied for CSI-RS and/or reference signal generation and descrambling, at the receivers. Thus, it needs slot configuration to provide occurrence occasion for reference signal resource with respect to PO. Here slot configuration is not periodic as it was in legacy NR but only associated with paging configuration i.e. w.r.t. to PO. For example, a single-port CSI-RS is proper for Idle/Inactive mode RRM measurement and as well, as time, frequency and gain acquisition purposes, it is relevant that legacy NZP-CSI-RS and/or TRS resources with density 1 and 3 may be used. Further, once NZP-CSI-RS and/or TRS resources are scheduled for Idle/Inactive mode CIEs, a connected mode UEs need to be informed about these configurations so as to rate match their PDSCH reception for the REs used for common signal resources in Idle or Inactive mode. There could be three options to perform that:

Option 1: The connected mode UEs need to read the at least one of broadcast or RRC signaling information when there are configuration changes pertinent to common reference signal resources in Idle or Inactive mode take place.

Option 2: The connected mode UEs are informed by the dedicated RRC reconfiguration message when there are configuration changes pertinent to common reference signal resources in Idle or Inactive mode take place. That is, network may configure the common reference signal resources in Idle or Inactive mode as ZP-CSI-RS resource for the connected UEs.

Option 3: UEs are configured by the dedicated RRC Release message moving to Idle/Inactive mode.

Furthermore, Release 17 Idle/Inactive mode UEs not supporting reference signal resources in Idle or Inactive mode should not be affected with isolated resource placement. However, for a legacy connected mode UE (i.e. Release 15 and 16) operating in a Release 17 network supporting reference signal resources in Idle or Inactive mode, it is proposed that option 2 can address the case for legacy UEs. Also, a legacy Idle/Inactive mode UE is not affected. In another embodiment of the present disclosure, reference signal resources in Idle or Inactive mode resources may be configured and scheduled such that it does not cause any conflict with other reference signals like SSB or PDCCH DMRS or PDSCH DMRS. UE is also supposed to not read reference signal resources in Idle or Inactive mode resources when there is any potential conflict with other reference signal is anticipated. reference signal resources in Idle or Inactive mode resources are also confined to the Downlink and/or Flexible symbols as per the TDD-UL-DL-Config_Common.

According to yet another embodiment of the present subject matter, UE indicates its capability or preference or priority to support the reference signal resources in Idle or Inactive mode in Idle/Inactive mode to the network. This may be communicated in the UE capability information message or UE assistance information message to the network. Accordingly, network considers provisioning reference signal resources in Idle or Inactive mode for UE(s) in Idle/Inactive mode. For example, there can be consideration for the number of the UEs availing such resources, effective spectral cost for resources and resultant increase or decrease in network load or so on, UE may consider factors related to misalignment of SSB resources position occurrence with respect to PO, need for power saving and so on. It may be possible for UE to provide indication or capability information to network in connected mode or if UE is in Idle/Inactive mode can transition temporarily to connected mode to convey the indication or assistance.

In another embodiment of the present subject matter, reference signal resources in Idle or inactive mode configuration for Idle/Inactive mode is provided to the UE in the RRC connection release and/or Redirection message from the network.

In another embodiment of the present subject matter, the UE prefers to reselect to a cell which supports the configuration for reference signal resources in Idle/Inactive mode to enhance the power saving.

According to yet another embodiment of the present subject matter, configuration parameter/parameter set termed as slotConfig provides occurrence occasion for reference signal resources in Idle or Inactive mode with respect to PO. For reference signal (e.g. CSI-RS) resources for Idle/Inactive UEs, a common scrambling Id is applied for reference signal resources in Idle or Inactive mode generation and descrambling at the UEs. Configuration same as Connected mode NR NZP CSI-RS and or TRS resources may be used for Idle Inactive mode RRM measurements and gain, time, and frequency synchronization. For example, this implies a single-port and density 1 and 3 CSI-RS resources. It is considered to have the afore-mentioned two options for informing connected mode UEs when there are configurations changes pertinent to common reference signal resources utilized for Idle/Inactive UEs.

In another embodiment of the of the present subject matter, a network node (Network node) may configure new NZP CSI-RS and/or TRS resources for Idle/Inactive mode, or it may reuse the already configured NZP CSI-RS and/or TRS resources being, used for the connected mode UEs for the purpose of Idle/Inactive UEs as well. As an example, in order to make reference signal resources available for Idle/Inactive UEs, there is a need for some broadcast mechanism to inform resource configurations to these UEs. Thus, placing the new configuration within DownlinkConfigCommonSIB in SIB1 wherein pcch-Config is also provided may be considered as one of the approaches.

According to yet further embodiment of the present subject matter, reference signal resources in Idle or Inactive mode IdleInactiveUEs are conveyed by a broadcast e.g. along with pcch-Config in SIB1 or a different existing SIB or a new SIB message. A detailed procedure to group/multiplex multiple UEs will be explained in the forthcoming paragraphs.

According to another embodiment, a network node configures the Idle or Inactive mode UE or UEs with a plurality of reference signal for at least one of current serving cell and a plurality of neighboring cells to perform RRM measurement.

In another embodiment of the current invention, a network node enables similar QCL channel characteristics such as at least one of Doppler Shift, Doppler Spread, Average Delay, Delay Spread and Spatial Rx Parameter between reference signal resource port in Idle or Inactive mode and paging PDCCH and or PDSCH DMRS ports. Such QCL channel characteristics is transmitted to the UE by the network entity through at least one of broadcast and RRC signaling message.

Now, according to the existing mechanism in NR wireless system, the UE monitors PDCCH as per the Paging Occasion (PO) on Paging Frames (PF). The SFN for PF is determined as shown in below Table 1.

TABLE 1

SFN for the PF is determined by:
(SFN + PF_offset) mod T = (T div N)*(UE_ID mod N)
Index (i_s), indicating the index of the PO is determined by:
i_s = floor (UE_ID/N) mod Ns
The following parameters are used for the calculation of PF and i_s above:
T: DRX cycle of the UE
N: number of total paging frames in T
Ns: number of paging occasions for a PF
PF_offset: offset used for PF determination
UE_ID: 5G-S-TMSI mod 1024

According to the DRX cycle configuration, a group of UEs (paging group) comes out of DRX-sleep and monitor PF for Paging DCI reception. These UEs belonging to the same paging group utilizes the same set of reference signal resources in Idle or Inactive mode for (re)synchronize with the network as per solution explained above. Hence, most relevant approach for grouping multiple UEs to avail and utilize common reference signal resources for Idle/Inactive mode of operation is to link this with the paging group configuration. slotConfig provides occurrence occasion(s) for reference signal resource with respect to PO.

One solution to associate reference signal resource with the paging group is to distinguish based on different Scrambling ID associated with reference signal resources of the same paging group. UE descrambles the reference signal resources using the Scrambling ID associated with its paging group. The Scrambling ID associated with the paging group is determined as a function of the calculated PO, for example, one possible formulation is as shown in Table 2.

TABLE 2

Scrambling = ( (Cell_specific_Id or PhysicalCellId) mod PO)

The network can specifically transmit Cell_specific_Id in SIB message or PhysicalCellId can be used.

According to further embodiment of the present subject matter, reference signal resources for Idle/Inactive mode UEs are grouped together for multiple UEs in accordance with the paging group configuration. Association of reference signal resources with the paging group is distinguished based on Scrambling ID. The Scrambling ID for reference signal resources associated with the paging group is determined based on UE's PO. A Cell_specific_Id configured by Network node may be used for determining Scrambling ID. In absence of Cell_specific_Id configured by Network node, a PhysicalCellId may be used for determining the Scrambling ID. Further, in a multi-beam scenario, different reference signal resources may be associated with each SSB beam in Network node configuration. In such scenario, selection of beam and tracking mechanism through reference signal resources for multiple beams are up to DE implementation. UE may assume serving SSB as the base for QCL and timing calculation of reference signal resources.

According to another embodiment of the present subject matter, a network node for provisioning radio resources for Idle or Inactive mode UEs in wireless network. The network node includes a processor to configured to receive from Idle or Inactive mode of a UE a plurality of reference signals comprising of reuse of at least one of Connected mode reference signal including at least one of Non-Zero Power Channel State Indicator Reference Signal (NZP CSI-RS) resource. Tracking Reference Signal (TRS) resource, and Phase Tracking Reference Signal (PTRS) resource. The network node processor may be configured to receive a new reference signal including at least one of NZP CSI-RS resource, RS resource, PTRS resource and new Demodulation Reference Signal (DMRS) or DMRS like signal. The network node processor may be configured to enable the UE based on at least one of the reference signal from the configured plurality of reference signals for performing one or more of at least one of gain, time, phase and frequency synchronization, Radio Resource Management (RRM) measurements, and Quasi-Co-Location (QCL) assumption for Paging PDCCH decoding.

The network node may be configured to perform on received configuration of reference signal as at least one of place new configuration within existing broadcast message such as SIB1 or other SIB or newly introduced broadcast message such a new SIB in the Idle/Inactive mode. The Network node may configure UEs in the connected mode by RRC signalling such as an RRC reconfiguration message based on configuration changes pertinent to common reference signal resources. The network node may configure UEs by at least one of RRC Release/RRC release with Suspend config and RRC Release with Redirection message when moving UE to Idle or Inactive mode from Connected mode.

The network node may be configured to perform the configuration of reference signal resource in Idle/Inactive mode as at least one of a first type of mapping defined by configuring by Network node as a plurality of slot and symbol offset before paging occasion (PO) and a second type of mapping defined by configuring by Network node, a plurality of symbols of paging slot for reference signal resources transmission for each beam.

The network node may be configured to perform, by the network node, at least one of: reusing the Connected Mode scrambling ID and configuring a common scrambling ID for the reference signal reception for Idle/Inactive UEs and descramble at the UEs the reference signal resources based on the configured scrambling ID. The common scrambling ID is determined based on Paging Occasion (PO) and at least one of a Cell specific identifier configured by Network node and a Physical Cell identifier for determining the Scrambling ID.

The network node may be configured for beam sweeping for paging. The network node may be configured to beamform reference signal resources by enabling at least one CSI-RS resource per beam based on transmission of CSI-RS resources across all the beams. The network node may be configured to provide reference signal resources by the network entity beamforming related configurations to UE using at least one of: broadcast and RRC signalling message. The network node may be configured to select by UE the beam(s) for the reception of the paging message by selecting beam(s) based on at least one of: SSB and reference signal resources. The network node may be configured to use by the UE the reference signal for Time/Frequency/Phase correction and gain control before the PO.

According to another embodiment of the present subject matter, the UE for provisioning radio resources for Idle or Inactive mode in a wireless network. The UE includes a processor and a transceiver configured to receive from a network node during Idle or Inactive mode a plurality of reference signals comprising of reuse of connected mode reference signals including at least one of Non-Zero Power Channel State Indicator Reference Signal (NZP CSI-RS) resource, Tracking Reference Signal (TRS) resource, and Phase Tracking Reference Signal (FIRS) resource. The UE may be configured to configured to receive from a network node during Idle or Inactive mode a plurality of a new reference signal including at least one of NZP CSI-RS resource, TRS resource, PTRS resource, new Demodulation Reference Signal (DMRS) or DMRS like signal. The UE may be configured to perform based on said at least one of the reference signals from the configured plurality of reference signals one or more of at least one of gain, time, phase and frequency synchronization, Radio Resource Management (RRM) measurements and Quasi-Co-Location (QCL) assumption for Paging PDCCH decoding.

According to another embodiment, a UE performs RRM measurement in Idle or Inactive mode using a subset of reference signal for at least one of current serving cell and a plurality of neighboring cells from the configured plurality of the reference signal resources. The measurement includes at least one of Reference Signal Received Power (RSRP), Reference Signal Received Strength Indicator (RSSI), Channel Quality indicator (CQI) and Signal to Interference Noise Ratio (SINR) of the channel condition.

In another embodiment of the current invention, a UE performs the channel estimation of at least one of the parameters such as Doppler Shift, Doppler Spread, Average Delay, Delay Spread and Spatial Rx Parameter based on selected reference signal resource in Idle or Inactive mode and assumes similar channel characteristics for decoding paging PDCCH and or PDSCH DMRS ports as configured by the network node in at least one of broadcast and RRC signaling message.

The UE may be configured to select the reference signal resource from the configured plurality of the reference signal resources based on at least one or more of its paging occasions, scrambling ID, channel conditions, support of specific 3GPP release, UE capability, position of the reference signal in time domain with respect to its PO.

The UE processor may be configured to indicate the information pertaining to preference, capability, assistance to support the reference signal resources in Idle/Inactive mode to the network by communicating through a capability information message or UE assistance information message. The capability information message or UE assistance information message is based on at least one of misalignment of SSB resources position or occurrence with respect to the paging occasion (PO), change of cell or serving gNB or hangover or UE identity change, and requirement for power saving.

In another embodiment, the UE may be configured for beam sweeping for paging. The UE processor may be configured to receive configuration related to beamforming information of reference signal resources from the network entity in Idle/Inactive mode through at least one of: broadcast and RRC signalling message. The UE processor may be receiving learn-formed reference signal resources by selecting at least one reference signal resource per beam based on configuration of reference signal resources across all the beams in Idle/Inactive mode. The UE processor may be configured to select by UE the beam(s) for the reception of the paging message by selecting beam(s) based on at least one of: SSB and reference signal resources. The UE processor may be configured to use by the UE the reference signal for at least one of Time, Frequency, Phase correction and gain control before the PO.

According to further embodiment of the present subject matter, in multi-beam operation, reference signal resources may be associated with SSB beams. UE may consider corresponding SSB as the base for QCL and timing calculation of reference signal resources.

According to another embodiment of the present subject matter, the newly proposed reference signal resources may be used as the base for QCL information of the corresponding paging PDCCH by the UE. The QCL relation of the paging PDCCH with SSB/reference signal may be configured by the network through SIB/RRC messages.

According to another embodiment of the present subject matter, the reference signal used for Idle/Inactive mode may also include at least one of TRS (Tracking Reference Signal), PTRS (Phase Tracking Reference Signal), a newly introduced DMRS (Demodulation Reference Signal) or DMRS like signal. Legacy DMRS signal associated with paging PDCCH (PDCCH DMRS) may also be enhanced to configure before PO for tracking synchronization purpose.

According to yet another embodiment of the present subject matter, specific RF (Radio Frequency) sequence may be used for Idle/Inactive mode operation. The reference signal and/or RE sequence may be same as used for WUS (Wake-Up Signal) or paging indication operation for paging an UE or paging-sub-group of UEs or group of UEs that may also be utilized in Idle/Inactive mode for NR. With this regard, a common solution addressing reference signal resources and/or RF sequence for time, frequency, gain acquisition and RRM measurement in Idle/Inactive mode as well as paging indication with presence/pattern of the reference signal and/or RF sequence can be used.

According to further embodiment of the present subject matter, reference signal/RF sequence used for Idle/Inactive mode may be either same or different frequency, band, band-width part (BWP), sub-carrier spacing, power allocation and so on as compared to that used for paging and/or other Idle/Inactive mode operations. Moreover, it is possible for UE to utilize same or different RF circuitry to detect/measure/receive the reference signal and/or RF sequence.

Thus, the present subject matter addresses above-mentioned various issues by provisioning a new reference signal for the Idle/Inactive mode UEs which is better aligned/positioned with respect to the paging occasion and is power efficient which further helps in reducing power consumption for the Idle/Inactive mode UEs.

Figure 8:
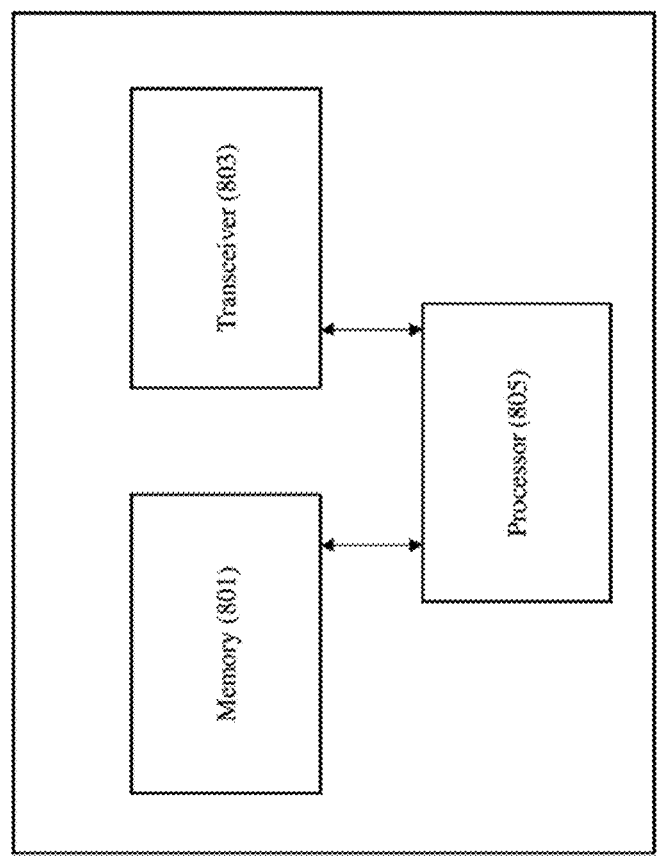
FIG. 8 illustrates a block diagram 800 of a network entity for provisioning radio resources for Idle or Inactive mode user equipment in wireless network, in accordance with an embodiment of the present subject matter.

FIG. 8 illustrates a block diagram 800 of a network entity for provisioning radio resources for Idle or Inactive mode user equipment in wireless network, in accordance with an embodiment of the present subject matter. In an embodiment, the network entity 800 may comprise a memory 801, a processor 805, and a transceiver 803. The processor 805 is coupled to the memory 801 and the transceiver 803. In an embodiment of the present disclosure, the processor 803 may be configured to perform the method as discussed in respect to FIG. 3. Moreover, the processor 803 may also be configured to perform the techniques discussed above.

Figure 9:
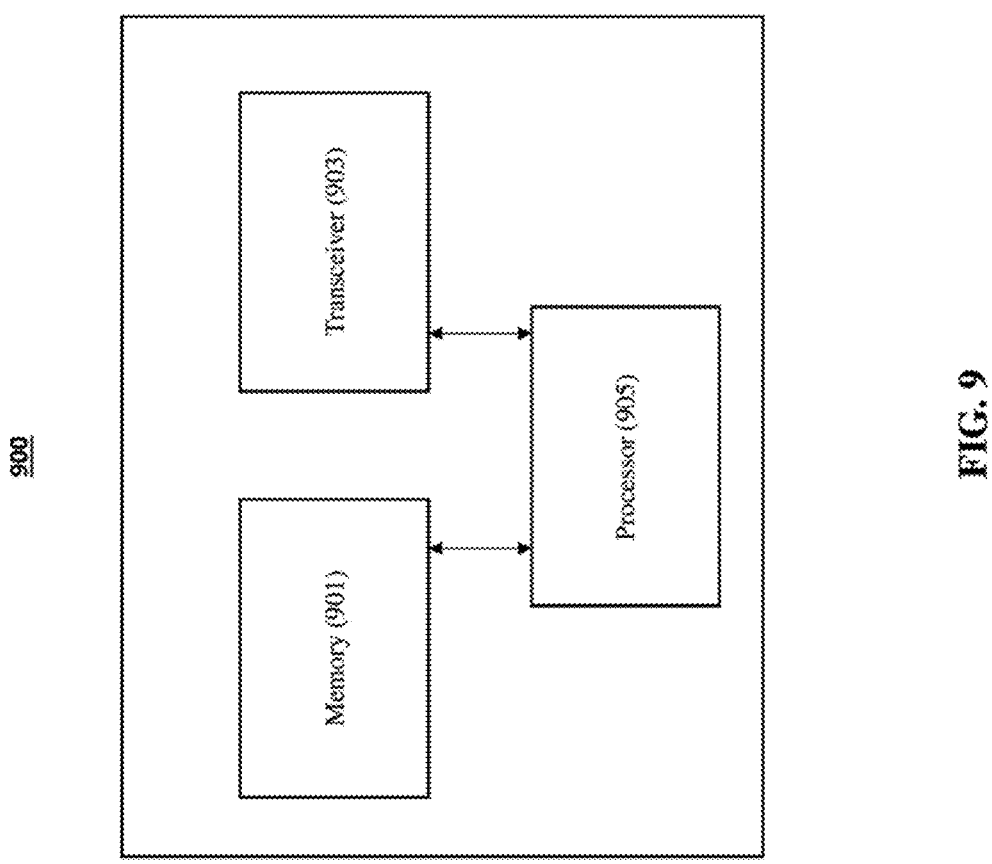
FIG. 9 illustrates a block diagram 900 of a user equipment for provisioning radio resources for Idle or Inactive mode user equipment in wireless network, in accordance with an embodiment of the present subject matter Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

FIG. 9 illustrates a block diagram 900 of a user equipment for provisioning radio resources for Idle or Inactive mode user equipment in wireless network, in accordance with an embodiment of the present subject matter. In an embodiment, the network entity 900 may comprise a memory 901, a processor 905, and a transceiver 903. The processor 905 is coupled to the memory 901 and the transceiver 903. In an embodiment of the present disclosure, the processor 903 may be configured to perform the method as discussed in respect to FIG. 3. Moreover, the processor 903 may also be configured to perform the techniques discussed above.

In an exemplary embodiment, the processors 803, 903 may be a single processing unit or a number of units, all of which could include multiple computing units. The processors 803, 903 may be implemented as one or more microprocessors, microcomputers, microcontrollers, digital signal processors, central processing units, state machines, logic circuitries, and/or any devices that manipulate signals based on operational instructions. Among other capabilities, the processors 803, 903 may be configured to fetch and execute computer-readable instructions and data stored in the memory. The processors 803, 903 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors control the processing of the input data in accordance with a predefined operating rule or artificial intelligence (AI) model stored in the non-volatile memory and the volatile memory 801, 901. The predefined operating rule or artificial intelligence model is provided through training or learning.

In an embodiment, the memory 801, 901 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are nor limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for provisioning radio resources for Idle or Inactive mode UEs in wireless network, the method comprising
    configuring by a network node for idle or Inactive mode of a UE:
    a plurality of reference signals comprising of:
    reuse of at least one of Connected mode reference signal including at least one of:
        Non-Zero Power Channel State indicator Reference Signal (NZP CSI-RS) resource
        Tracking Reference Signal (TRS) resource
        Phase Tracking Reference Signal (PTRS) resource
        a new reference signal including at least one of:
        NZP CSI-RS resource
        TRS resource
        PTRS resource
        new Demodulation Reference Signal (DMRS) and enabling the UE based on at least one of the reference signal from the configured plurality of reference signals for performing one or more of:
        at least one of gain, time, phase, and frequency synchronization;
        Radio Resource Management (RRM) measurements; and
        Quasi-Co-Location (QCL) assumption for Paging PDCCH decoding, wherein the configuration of reference signal resource is performed as at least one of:
    placing new configuration within existing broadcast message such as SIB1 or other SIB or newly introduced broadcast message such a new SIB in the Idle/Inactive mode;
    configuring UEs in the Connected mode by RRC signaling such as an RRC reconfiguration message based on configuration changes pertinent to common reference signal resources; and
    configuring UEs by at least one of RRC Release, RRC Release with Suspend Config and RRC Release with Redirection message when moving UE to Idle or Inactive mode from Connected mode.

2. The method as claimed in claim 1, wherein the configuration of reference signal resource is performed in Idle or Inactive mode as at least one of:
    a first type of mapping defined by configuring by Network node as a plurality of slot and symbol offset before paging occasion (PO); and
    a second type of mapping defined by configuring by Network node, a plurality of symbols of paging slot for reference signal resources transmission for each beam.

3. The method as claimed in claim 1, further comprising:
    performing, by the network node, at least one of: reusing the Connected Mode scrambling ID and configuring a common scrambling ID for the reference signal reception for Idle/Inactive UEs; and
    descrambling at the UEs the reference signal resources based on the configured scrambling ID in Idle or Inactive mode.

4. The method as claimed in claim 3, wherein the common scrambling ID is determined based on Paging Occasion (PO) and at least one of:
    a Cell specific identifier configured by Network node; and
    a Physical Cell identifier for determining the Scrambling ID.

5. The method as claimed in claim I, further comprising:
    indicating by the UE information pertaining to preference, capability, assistance to support the reference signal resources in Idle or Inactive mode to the network by communicating through at least one of capability information message and UE assistance information message.

6. The method as claimed in claim 5, wherein the capability information message or UE assistance information message is based on at least one of:
    misalignment of SSB resources position or occurrence with respect to the paging occasion (PO);
    change of cell or serving gNB or handover or UE identity change;
    requirement for power saving.

7. The method as claimed in claim 1, wherein a reuse of Connected mode reference signal used for Idle or Inactive mode comprises at least one of CSI-RS (Channel State Indicator Reference Signal), TRS (Tracking Reference Signal), PTRS (Phase Tracking Reference Signal), a newly introduced DMRS (Demodulation Reference Signal).

8. The method as claimed in claim 7, wherein the reference signal resources are associated with SSB beams and wherein the UE considers a corresponding Synchronization Signal Block (SSB) as the base for quasi-colocation (QCL) and a timing calculation of reference signal in Idle or Inactive mode.

9. The method as claimed in claim 8, the QCL type and association with SSB for the reference signal resource is configured by network node in at least one of a broadcast message and a RRC signalling message.

10. The method as claimed in claim 1, the QCL type of paging PDCCH and association with SSB and/or reference signal resource in Idle or Inactive mode is configured by network node in at least one of a broadcast message and a RRC signalling message.

11. The method as claimed in claim 1, a UE selects the reference signal resource from the configured plurality of the reference signal resources based on at least one or more of:
    its paging occasion (PO);
    scrambling ID;
    channel conditions;
    support of specific 3GPP release;
    UE capability; and
    position of the reference signal in time domain with respect to its PO.

12. The method as claimed in claim 1, wherein a frequency for reference signal resource used for Idle or Inactive mode is at least one of:
    same frequency, band, band-width part (BWP), sub-carrier spacing, power allocation than that is used for initial BWP; and
    different frequency, band, band-width part (BWP), sub-carrier spacing, power allocation than that is used for initial BWP.

13. The method as claimed in claim 12, the frequency, band, BWP, sub-carrier spacing and power allocation for the reference signal resource in Idle or Inactive mode is configured by network node in at least one of broadcast message and RRC signalling message.

14. The method as claimed in claim 12. the UE assumes frequency, band, BWP, sub-carrier spacing and power allocation for the reference signal resource in Idle or Inactive mode is same with the paging PDCCH and paging PDSCH in absence of configuration from network node in at least one of broadcast message and RRC signalling message.

15. The method as claimed in claim 1, the network node configures using at least one of a broadcast message and RRC signal providing at least one of:
    support for reference signal resource in Idle or Inactive mode;

frequency domain location of the reference signal resource;

time domain location of the reference signal resource in terms of slot and symbol position;

number of resources or repetitions or density of the reference signal in time and frequency domain;

QCL information for Paging PDCCH and reference signal resource;

QCL information for reference signal resource and SSB blocks;

Association or non-association of reference signal resource with SSB blocks;

power offset of reference signal resource with reference to SSB blocks; and slot and symbol offset of the reference signal resource from the Paging Occasion (PO).

16. The method as claimed in claim 1, the UE is configured performs at least one of frequency/time/phase/gain synchronization; RRM measurement; and Quasi-Co-Location (QCL) assumption for Paging PDCCH decoding based on SSB in at least one of:

when the reference signal resource is not configured by the network node in Idle or Inactive mode through at least one of broadcast and RRC signalling message;

when the reference signal resource is not available or indicated as not available at certain occasions or time period;

when the reference signal is not detected at certain occasions or time period;

when the reference signal is detected as disabled;

when the SSB position in time domain with respect to its paging occasion (PO) is nearby; and when misalignment for SSB is not detected at certain occasions or time period before the paging occasion (PO).

17. A method of beam sweeping for paging comprising the steps of:

the network node beamforming the reference signal resources by enabling at least one reference signal resource per beam based on transmission of reference signal resources across all the beams;

the network entity providing reference signal resources beamforming related configurations to UE using at least one of: broadcast and RRC signalling message;

selecting by UE the beam(s) for the reception of the paging message by selecting beam(s) based on at least one of: SSB and reference signal resources; and using by the UE the reference signal for Time/Frequency/Phase correction and gain control before the PO.

18. A network node for provisioning radio resources for Idle or inactive mode UEs in wireless network, the network node comprising a processor to configure Idle or Inactive mode of a UE:

a plurality of reference signals comprising of:

reuse of at least one of Connected mode reference signal including at least one of:

Non-Zero Power Channel State Indicator Reference Signal (NZP CSI-RS) resource

Tracking Reference Signal (TRS) resource

Phase Tracking Reference Signal (PTRS) resource a new reference signal including at least one of:

NZP CSI-RS resource

TRS resource

PTRS resource new Demodulation Reference Signal (DMRS) and enabling the UE based on at least one of the reference signal from the configured plurality of reference signals for performing one or more of:

at least one of gain, time, phase and frequency synchronization;

Radio Resource Management (RRM) measurements; and

Quasi-Co-Location (QCL) assumption for Paging PDCCH decoding, wherein the configuration of reference signal is performed as at least one of:

place new configuration within existing broadcast message such as SIB1 or other SIB or newly introduced broadcast message such a new SIB in the Idle/Inactive mode;

configure UEs in the connected mode by RRC signaling such as an RRC reconfiguration message based on configuration changes pertinent to common reference signal resources; and configure UEs by at least one of RRC Release/RRC release with Suspend config and RRC Release with Redirection message when moving UE to Idle or Inactive mode from Connected mode.

* * * * *